April 12, 1966 G. L. SHELTON, JR 3,246,293
CHARACTER SENSING METHOD AND APPARATUS
Filed Dec. 9, 1960 4 Sheets-Sheet 1
FIG. 1A FIG. 1B
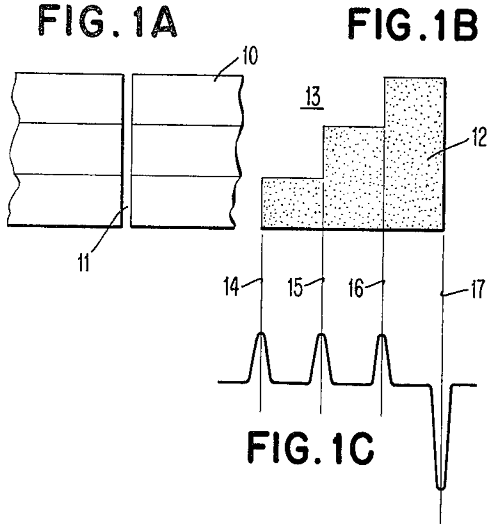
FIG. 1C
FIG. 2A FIG. 2B
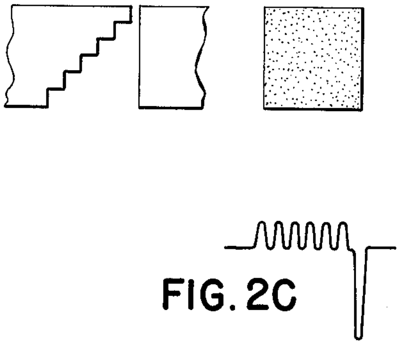
FIG. 2C
FIG. 3A FIG. 3B
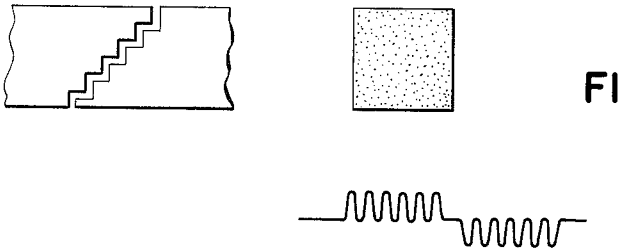
FIG. 3C
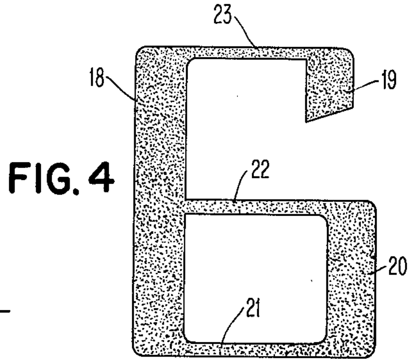
FIG. 4
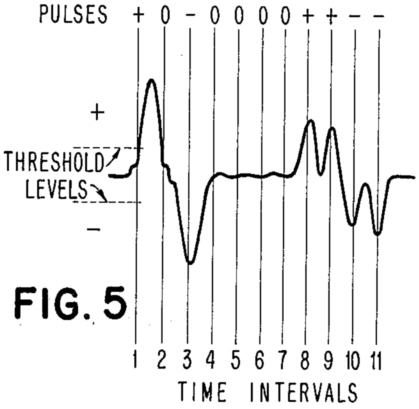
FIG. 5
FIG. 6
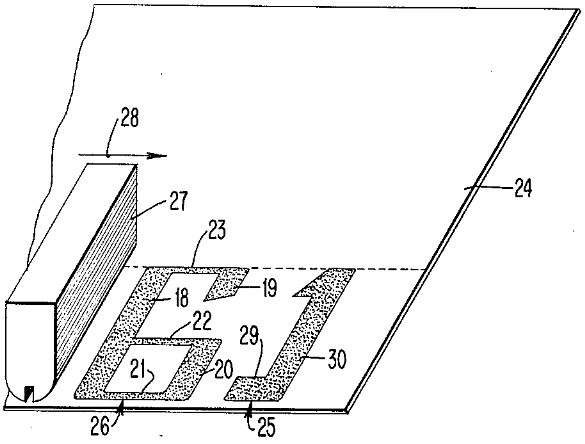
*INVENTOR.*
GLENMORE L. SHELTON, Jr.
*BY* Roy C. Hopgood
ATTORNEY

TIME INTERVAL

| TYPE FONT | 1 | 2 | 3 | 4 | 5 | 6 | 7 | 8 | 9 | 10 | 11 | SUM OF PULSES $\lvert\Sigma\rvert$ | SIGN OF 2nd. PULSE |
|---|---|---|---|---|---|---|---|---|---|---|---|---|---|
| 1 | +1 | 0 | +1 | 0 | −1 | 0 | 0 | 0 | 0 | 0 | 0 | 3 | + |
| 2 | +1 | +1 | 0 | −1 | 0 | 0 | 0 | −1 | 0 | −1 | 0 | 5 | + |
| 3 | +1 | +1 | 0 | −1 | 0 | 0 | 0 | +1 | +1 | −1 | −1 | 7 | + |
| 4 | +1 | 0 | 0 | 0 | 0 | 0 | 0 | +1 | 0 | −1 | −1 | 4 | + |
| 5 | +1 | +1 | −1 | −1 | 0 | 0 | 0 | 0 | +1 | 0 | −1 | 6 | + |
| 6 | +1 | 0 | −1 | 0 | 0 | 0 | 0 | +1 | +1 | −1 | −1 | 6 | − |
| 7 | +1 | 0 | 0 | 0 | 0 | 0 | 0 | 0 | 0 | 0 | −1 | 2 | − |
| 8 | +1 | +1 | −1 | −1 | 0 | 0 | 0 | +1 | +1 | −1 | −1 | 8 | + |
| 9 | +1 | 0 | −1 | −1 | 0 | 0 | 0 | 0 | +1 | 0 | −1 | 5 | − |
| 0 | +1 | 0 | −1 | 0 | 0 | 0 | 0 | 0 | +1 | 0 | −1 | 4 | − |

INVENTOR.
GLENMORE L. SHELTON, Jr.
BY
Roy C. Hopgood
ATTORNEY

| DIGIT | POLARITY OF 2nd PULSE | NO. OF PULSES |
|---|---|---|
| 0 | − | 4 |
| 1 | + | 3 |
| 2 | + | 5 |
| 3 | + | 7 |
| 4 | + | 4 |
| 5 | + | 6 |
| 6 | − | 6 |
| 7 | − | 2 |
| 8 | + | 8 |
| 9 | − | 5 |

INVENTOR.
GLENMORE L. SHELTON, Jr.
BY
Roy C. Hopgood
ATTORNEY

April 12, 1966 G. L. SHELTON, JR 3,246,293

CHARACTER SENSING METHOD AND APPARATUS

Filed Dec. 9, 1960 4 Sheets-Sheet 4

*INVENTOR.*
GLENMORE L. SHELTON, Jr.

*BY*
Roy C. Hopgood
ATTORNEY

United States Patent Office 3,246,293

Patented Apr. 12, 1966

3,246,293

CHARACTER SENSING METHOD AND APPARATUS

Glenmore L. Shelton, Jr., Mahopac, N.Y., assignor to International Business Machines Corporation, New York, N.Y., a corporation of New York Filed Dec. 9, 1960, Ser. No. 74,798
7 Claims. (Cl. 340—146.3)

This invention, generally, relates to improvements in the art of automatically reading human language by machine and, more particularly, to a method and apparatus for reading a uniquely formed human language symbol.

Systems have been developed in the past to read human language which is printed on documents as symbols in magnetizable ink. In one such system, the symbols are magnetized and moved in sequence past a transducer having a transverse slit, the transducer being responsive to narrow transverse portions of each scanned symbol to generate a distinctive electrical wave shape.

However, in those prior systems which depend upon distinctive shapes developed in electrical waves, it is necessary to rely upon apparatus to distinguish variations in amplitudes between the respective waves to identify the particular symbol scanned. It has been found in practice that the difference in amplitudes between adjacent waves is not a fixed difference, but may be varied, for example, when the angle of the transducer is altered during scanning and, also, when the particular symbols being scanned are poorly printed. These variations, therefore, develop errors. Other errors in reading may develop when the magnetic ink is not distributed uniformly and when the symbols are not magnetized uniformly.

Still other errors in reading tend to develop from an inadequate sampling of a wave shape, and this is due to occasions when the time regulating circuits are not accurate and/or when the rate of scanning of the symbols changes. Also, systems which have been developed in the past to read human language depend upon an exact document speed, and they depend upon the leading portion of each character being sharp and exact.

Accordingly, it is an object of this invention to provide a system to read human language symbols automatically without the accompanying disadvantages mentioned above.

It is also an object of the invention to provide a method of reading a form of human language symbols which is both accurate and highly reliable.

Another object of the invention is to provide a new and improved reading system which responds to human language symbols uniquely formed of magnetizable material.

Still another object of the invention is to provide an improved system for developing electrical signals representative of individual legible symbols of human language information.

A further object of the invention is to provide a new and improved system for reading electrical signals which are characteristic of the individual symbols.

Briefly, the invention contemplates an asynchronous logic system for automatically reading legible information which is uniquely formed of magnetizable material on a carrier of non-magnetizable material in such an arrangement as to present regions extending between substantially equidistantly spaced parallel lines to provide parallelograms which may be identifiable visually. The surface of the magnetizable material is substantially constant throughout the region, and the area of the magnetizable material changes abruptly at the boundaries of each region.

In accordance with the method of the invention, a symbol as described above is scanned by a transducer having a transverse slit to produce an asynchronous logic code. The pulse count and the pulse sequence of the code is characteristic of each respective symbol and, consequently, is adaptable to ternary logic or three level code, such as +1, 0 or −1, for identifying the associated symbol.

Other objects and advantages of the invention will be pointed out in the following description and claims and illustrated in the accompanying drawings, which disclose by way of example the principle of the invention and the best mode which has been contemplated of applying that principle.

In the drawings:

FIG. 1A is a fragmentary plan view of a transducer having a transverse slit;

FIG. 1B is a diagrammatic form of a symbol to be read by the transducer shown in FIG. 1A;

FIG. 1C shows a series of pulses developed by the transducer of FIG. 1A as the symbol in FIG. 1B is scanned;

FIG. 2A is a fragmentary plan view of a transducer having a transverse slit, one edge of which is stepped back away from the other edge;

FIG. 2B is a diagrammatic form of a symbol to be read by the transducer shown in FIG. 2A;

FIG. 2C shows a series of pulses developed by the transducer of FIG. 2A as the symbol in FIG. 2B is scanned;

FIG. 3A is a fragmentary plan view of a transducer having a uniformly stepped slit extending transversely;

FIG. 3B is a diagrammatic form of a symbol to be read by the transducer shown in FIG. 3A;

FIG. 3C shows a series of pulses developed by the transducer of FIG. 3A as the symbol in FIG. 3B is scanned;

FIG. 4 is a distinctive symbol constructed in accordance with the invention;

FIG. 5 shows a wave form derived from a scanning from left to right of the symbol shown in FIG. 4;

FIG. 6 shows the reading of information from a document or carrier bearing symbols of magnetizable material in accordance with the invention;

Figures 7, 8:
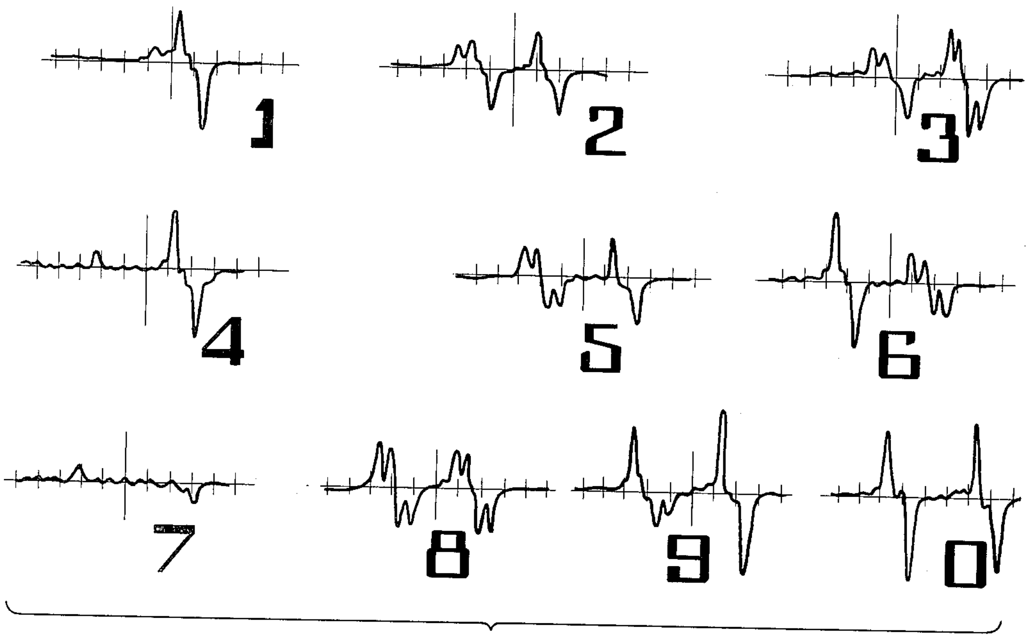
FIG. 7 shows a plurality of uniquely formed symbols and the wave form of signals produced by a scanning of each symbol from left to right.
FIG. 8 is a chart showing a count of pulses over a series of time intervals.

The invention concerns a system for automatically reading symbols which are formed of magnetizable material in such a manner that they can be read both by a machine and by the human eye. Each of the symbols is composed of a plurality of approximately rectangular regions of a magnetizable material, and each of these regions is visibly different from the carrier or document supporting the symbols.

The width of each rectangular region is approximately equal to the distance between a pair of substantially parallel, straight boundary lines which are spaced apart a predetermined distance, the spacing of boundary lines being determined by a plurality of arbitrary time intervals, as will be explained in greatetr detail presently. A symbol, therefore, is composed of one or more continuous regions of magnetizable material where the total height and width of the material changes only at the boundary lines. For example, the symbol "6" in FIG.

4 embodies three dominant regions 18, 19 and 20, each region being essentially a parallelogram. Thin lines 21, 22 and 23 merely permit visual recognition of the symbol.

When such symbols are scanned by a transducer having a slit transverse to the direction of scan (parallel to the boundary lines of a symbol), the form of the wave that is developed by the transducer for a symbol has an antinode or peak pulse when a boundary is crossed at a point where a change in magnetizable material occurs and a node or zero pulse where a boundary line is crossed at which there is no change in quantity of magnetizable material. Therefore, each of the symbolic wave forms contains nodes and antinodes at spaced apart intervals.

With such a wave form, any of a number of reading devices may be constructed or are presently available to read these wave forms in accordance with the asynchronous logic system of the invention. One reading device will be described in detail hereinafter, to illustrate the logic system for identifying (reading) symbols in accordance with the present invention.

Since the transducer which scans the symbols responds only to a change of the magnetizable material, the antinodes are developed by the transducer at each of the parallel lines where a boundary of magnetizable material occurs, and the transducer develops zeros or nodes when the transducer crosses one of the parallel lines at which there is no change in total quantity of magnetizable material. It has been found that information in the unique form of these symbols supported on a suitable carrier in conjunction with a suitable automatic reading device will assure more reliable and accurate reading of the information when the method of the invention is followed. For example, since the sequence of the various pulses is used, the exact time of occurrence of the pulses in a wave form is not significant, and since the system of the invention is asynchronous, no synchronizing signal is needed.

*Principle of the invention*

Refer now to FIGS. 1A, 1B and 1C. The most suitable transducer for use in reading the symbols in accordance with the invention is a transducer which is sensitive to the rate of change of magnetic flux as it is intercepted by a slit in the transducer. For example, a portion of a transducer 10 is shown in FIG. 1A of the drawings, and this transducer 10 has a slit 11 extending transversely thereacross.

A diagrammatic symbol 12 is formed of magnetizable material on a suitable carrier 13 of non-magnetizable material, and the numerals 14, 15, 16 and 17 indicate, respectively, a plurality of substantially parallel lines which are spaced apart equidistantly in accordance with an arbitrary time interval of scan by the transducer 10.

During the scan of a symbol, a positive pulse is developed by the transducer as the slit encounters an increase in quantity of the magnetizable material. Conversely, a negative pulse is developed when the quantity of magnetizable material decreases.

With the transducer 10 scanning the symbol 12 from left to right, the following unit change in total quantity of magnetizable material occurs: at the boundary line 14, a positive change; at boundary line 15, a positive change; at boundary line 16, a positive change; and at the boundary line 17, a large negative change. Therefore, the wave form supplied by the transducer 10 scanning the symbol 12 will have a series of positive antinodes corresponding to the stepped increase in quantity of magnetizable material and a negative antinode corresponding to a decrease in total quantity of magnetizable material, and the wave form will appear as seen in FIG. 1C.

Each of these antinodes, described above, is generated when the transducer 10 scans one of the boundary lines 14–17 at which there is a change in total quantity of magnetizable material, and the nodes (none of which apear in FIG. 1C) of a wave form will be produced when the transducer scans across a boundary line at which there is no change in total quantity of magnetizable material.

A modified form of transducer slit is shown in FIG. 2A of the drawings wherein the leading edge of the slit (as in the direction of scan) is substantially straight as contrasted with the opposite or trailing edge which is stepped back in successively increasing steps. With such a slit scanning a symbol, illustrated diagrammatically in FIG. 2B, a wave having a sequence of antinodes will be developed as shown in FIG. 2C.

Similarly, a stepped form of transducer slit as shown in FIG. 3A will develop a wave form having a plurality of positive antinodes and, then, a plurality of negative antinodes when scanning a diagrammatic symbol such as seen in FIG. 3B. Therefore, it is illustrated that even with portions of the slit being displaced in the direction of scan, the form of the wave developed by the transducer is still characterized by a recognizable sequence of antinodes.

FIG. 4 of the drawings illustrates an actual symbol constructed for use with the principles of the invention and represents the numeral "6." The symbol number "6" which is shown in FIG. 4 is positioned directly above FIG. 5 so that the time intervals 1, 2, 3 . . . 11 shown in FIG. 5 correspond with a plurality of equidistantly spaced, substantially parallel lines forming a basis of construction for the symbol in FIG. 4.

It will be seen that the symbol shown in FIG. 4 is dominated by three rectangularly shaped regions 18, 19 and 20, each of which has a width that spans two time intervals. The relatively thin lines 21, 22 and 23 which connect the rectangular regions are primarily for the purpose of permitting recognition of the symbol visually and will not contribute to the method of recognition of the symbol in accordance with the present invention.

As the symbol in FIG. 4 is scanned from left to right by a transducer having a straight slit extending transversely of the direction of scan (that is, substantially parallel with the time interval lines), a large quantity of magnetizable material is encountered at the time interval "1," and therefore, a first positive pulse is developed at the interval "1" in FIG. 5. As the scan continues, there is no change in the quantity of magnetizable material at the time interval "2," and since a voltage can be developed in the slit only for magnetic flux lines which are undergoing changes, there is no pulse developed at this second interval of time.

However, at the third interval of time, there is another change in quantity of magnetizable material, and it should be noted that the transducer passes from a region having magnetizable material to a region having negligible magnetizable material. Therefore, a negative pulse is developed at the third interval, as seen in FIG. 5.

Still continuing the scan, there are no further pulses developed until the rectangular region 19 is intercepted at the 8th interval, and since the total quantity of magnetizable material in this region 19 is less than that which is in the region 18, the pulse which is developed now will be somewhat smaller in amplitude. At the next succeeding time interval, the boundary at the beginning of the region 20 is crossed, and a second positive pulse is developed.

At the 10th time interval of the scan, the transducer passes from over the region 19, and a negative pulse is developed. Similarly, a negative pulse is developed as the transducer moves from the region 20.

With the threshold level of a suitable reading circuit sufficiently low and with the circuit responsive to the number of pulses, not only will the sense of the detected pulses be recorded, but their sequence will be recorded also. For example, for the scan described above, the pulse senses and sequence will be +0−0000++−−, and there are a total of four pulses. This pulse count is indicated at the top of FIG. 5 in the drawings.

In FIG. 6 of the drawings, a carrier or document 24 bearing symbols 25 and 26 of the type shown in FIG. 4 is positioned for scanning by a transducer 27 in the direction indicated by an arrow 28. These symbols 25 and 26 are formed of magnetizable material on the carrier 24 and are selected from a group of symbols, as shown in FIG. 5, which are uniquely adapted for use with the invention.

As mentioned previously, each of the symbols used with the method of the invention is formed with a continuous region of magnetizable material, the total quantity of which changes only at the boundary lines. As the transducer 27 responds to the rate of change in time of the total quantity of magnetizable material passing before the transducer slit, the antinodes of the wave form are developed by the transducer, and the nodes are developed as the transducer scans across time interval lines at which the total quantity of magnetizable material remains unchanged.

The rectangular regions of magnetizable material for the symbol "6" has been described previously above, and the regions for the symbol "1" shown in FIG. 6 are identified by the numerals 29 and 30.

While some of the symbols used with the invention may be formed with slightly rounded corners to simplify some printing or reproduction processes, it is preferred that the number of the rounded corners and the curve radii of these rounded corners be kept to a minimum.

The particular sequence of the pulses which are developed by the transducer depends upon whether the transducer is moved past the symbol or whether the transducer is stationary and the symbol is moved past the transducer; in other words, the sequence of the pulses depends upon whether the scan is from the left to the right or from the right to the left. However, the only difference in the resultant pulse sequence due to the direction of scan is that the curve is reversed, but with the polarity of the respective pulses remaining unchanged.

The curves shown in FIG. 7 for each of the number symbols from 0 to 1 are illustrative, for example, of the instance where the symbols are stationary and the transducer is moved from left to right. In other words, each of the symbols shown in FIG. 7 is scanned from left to right to produce the curves indicated. In accordance with the invention, therefore, the sense and the sequence of the pulses shown in FIG. 7 are recorded in the chart in FIG. 8.

Referring now to the chart shown in FIG. 8, the first pulse for each symbol is invariably positive, since the scan must encounter some magnetizable material initially. However, after the first pulse, the remaining pulses which are developed are significant in accordance with the invention to identify the symbol scanned.

By way of example, the sense and sequence of the pulses for the curve representative of the symbol "6," described previously, is indicated by the time interval 1–11 in FIG. 8 as being +0−000++−−−. As an additional illustration of the chart shown in FIG. 8, consider now the symbol "1" shown in FIG. 6, together with its curve shown in FIG. 7, the sense and sequence of the pulses are +0+0−000000.

Counting the first pulse in each instance for the first time interval, the absolute sum of the pulses for each symbol is shown in the second column from the right hand side in FIG. 8. By way of example, the total number of pulses, ignoring the polarity of the pulses for the symbol "1" is three (two positive pulses and a negative pulse).

Similarly, the total number of pulses for the symbol "6," again counting the first pulse at the first time interval, is six (three positive pulses and three negative pulses). However, when considering only the information in the Sum of Pulses column, the second column from the right hand side of FIG. 8, it would not be possible to distiguish between the symbols 4 and 0 and the symbols 5 and 6, but the other symbols are distinguishable on this information alone.

Therefore, to distinguish the respective curves further, the sense of the first pulse following the pulse at interval 1, is recorded also, as seen in the last column to the right of FIG. 8. For example, the first pulse after the interval 1 for the symbol "1" is a positive pulse, and the first pulse for the symbol "6," ignoring the pulse at the interval 1, is a negative pulse. Now, it may be seen that with the information in the last two columns in FIG. 8, taken together, each of the symbols 0–9 can be distinguished and identified readily.

*A reading apparatus*

Figures 9, 10:
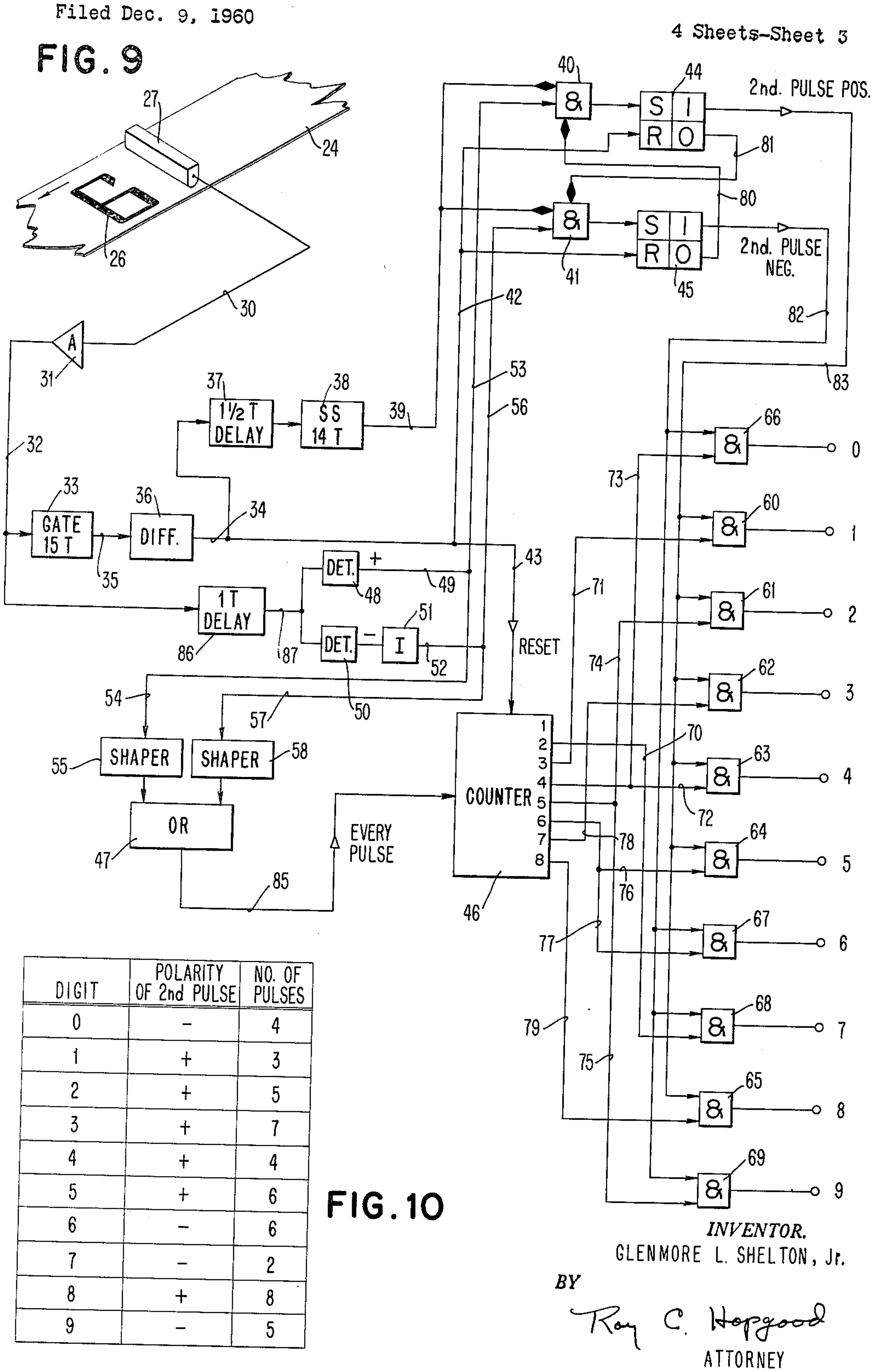
FIG. 9 is a circuit diagram for utilizing the pulse information shown in FIG. 6 in accordance with the invention.
FIG. 10 is a chart of selected columns from the chart in FIG. 6.

FIG. 9 of the drawings shows one form of an apparatus to read symbols in accordance with the principles of this invention. After a carrier 24 is scanned by a transducer 27, a symbol 26 develops a series of pulses as has been described. These pulses are connected by means of a conductor 30 to a suitable amplifier 31 from which they are fed by means of a conductor 32 to a gate generator circuit 33 and also through a one time interval delay circuit 86 to pulse polarity detector circuits 48 and 50.

The gate generator circuit 33 initiates a continuous fifteen time interval output pulse over a conductor 35 in response to the first pulse received over the conductor 32 and the output of the gate generator circuit 33 is connected to a differentiator circuit 36. The output of the differentiator circuit 36, in turn, is a single pulse on the conductor 34 at the first time interval, and this pulse is applied to a 1½ time interval delay circuit 37 and to conductor 42 to reset the flip-flop relay circuits 44 and 45 and to conductor 43 to reset a counter circuit 46.

The purpose of the delay circuit 37 is to prevent the operation of the relays 44 and 45 during the first time interval by failing to condition either of the AND gate circuits 40 and 41. However, at 1½ time intervals after the receipt of the pulse from conductor 34, the delay circuit 37 provides a pulse that is connected directly to a single shot timing circuit 38 to provide a continuous pulse out over a conductor 39 to each of two AND circuits 40 and 41 for the remaining time intervals of each cycle. Therefore, the output of the differentiator circuit 36 provides an initial "reset" pulse in response to the otherwise unused first pulse over conductors 34, 42 and 43 to flip-flop relays 44 and 45 and to a counter circuit 46, respectively and initiates the generation of a pulse by the delay circuit 37.

A connection 80 provides a pulse to one of the inputs to the AND gate 40 when the relay 45 is in the reset position, and similarly, a conductor 81 connects the output of the relay 44 to one terminal of the AND gate 41 when the relay 44 is in a reset position. Such reset positions of the relays 44 and 45 are occasioned by a pulse from the differentiator circuit 36 in response to the otherwise unused initial positive pulse for each symbol.

As mentioned previously, each input pulse from the conductor 32 also is conveyed to a delay circuit 86 where it is delayed one time interval before a pulse is developed to the conductor 87 for transmission to a detector circuit 48 for developing an output pulse over a conductor 49 for each positive pulse received and to a detector circuit 50 for developing a negative pulse output, which is inverted by a pulse inverter 51, to provide a positive pulse to a conductor 52 for each negative pulse received.

A positive pulse provided by conductor 49 is connected by means of conductors 53 and 54 to the AND gate 40 and to a pulse shaping circuit 55, respectively. A positive pulse produced in the conductor 52 (an inverted negative pulse) is connected by means of conductors 56 and 57, to the AND gate 41 and to another pulse shaping circuit 58, respectively.

Each of the pulse shaping circuits 55 and 58 is connected through an OR circuit 47 directly to the counter 46 by means of a conductor 85 so that for each and every pulse developed by the transducer 27, the counter 46 steps to the next succeeding output stage.

The continuous pulse output of the flip-flop relay 44 is connected to a plurality of AND gates 60, 61, 62, 63, 64 and 65, and similarly, the continuous output of the flip-flop relay 45 is connected to a plurality of AND gates 66, 67, 68 and 69.

The output of the second stage for the counter 46 is connected by means of a conductor 70 to the AND gate 68, and the output of the third stage is connected by means of a conductor 71 to the AND gate 60. The output of the fourth stage supplies a pulse to both the AND gates 63 and 66 by means of conductors 72 and 73, respectively. The fifth stage of the counter 46 supplies a pulse over conductors 74 and 75 to AND gates 61, 69, respectively. The sixth stage of the counter 46 supplies a pulse to both of the AND gates 64 and 67 by means of conductors 76 and 77, but the output of the seventh stage is connected by conductors 78 to only the AND gate 62. A conductor 79 connects the 8th stage of the counter 46 with the AND gate 65.

The chart shown in FIG. 7A is a repeat of three columns from FIG. 6 to summarize for convenience the operation of the particular circuit shown in FIG. 7. By way of example, the digit "1" as seen in the chart in FIG. 7A provides a second pulse which is positive and provides a total of three pulses, in accordance with the invention.

Also, the digit "6" provides a second pulse which is negative and provides a total of six pulses.

*Operation*

Figure 11:
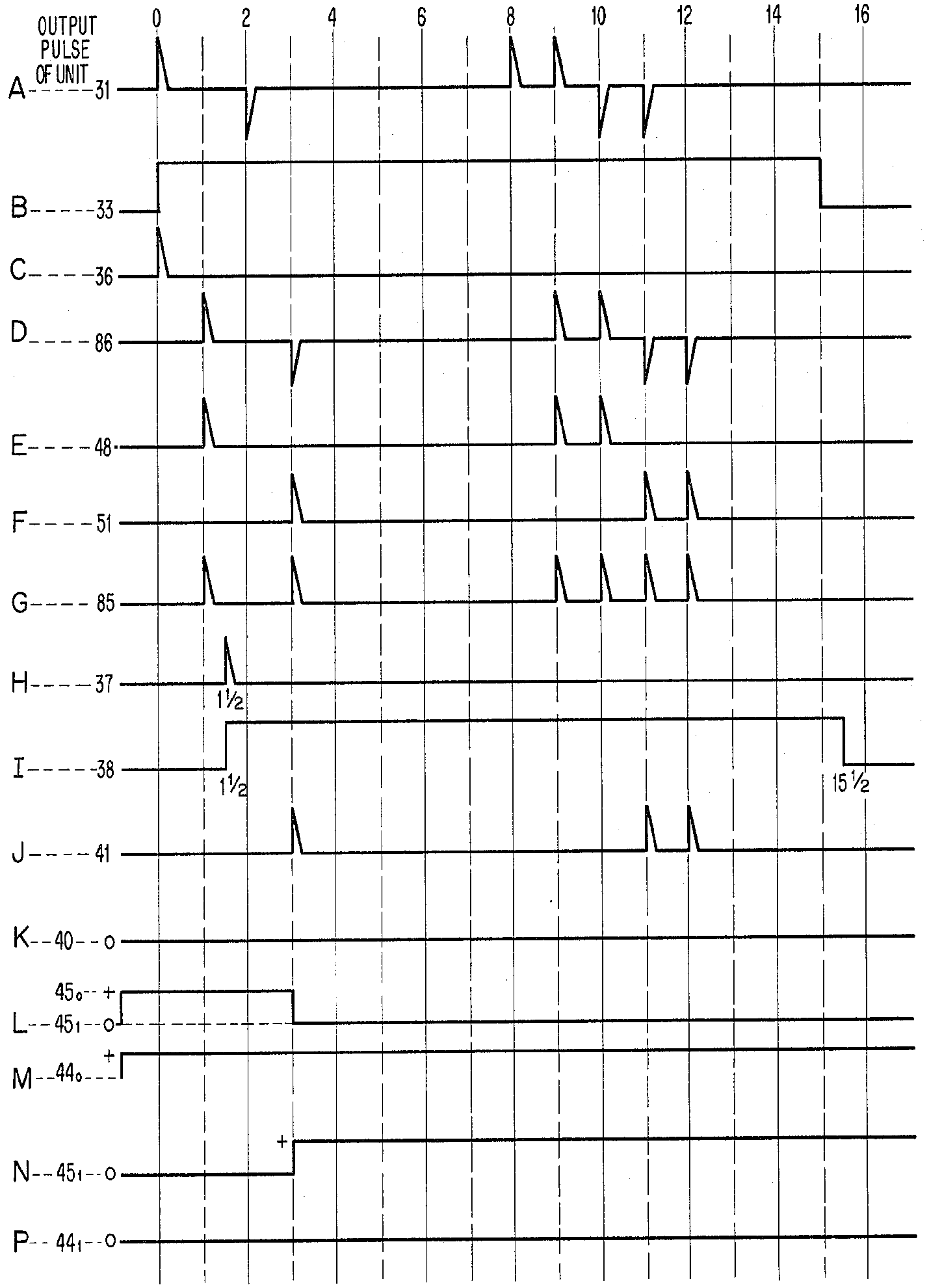
FIG. 11 shows curves for illustrating the various output pulse for respective component parts of the circuit shown in FIG. 9.

Referring to FIG. 11, to illustrate the operation of the circuit shown in FIG. 9 in response to a reading of stored information in accordance with the method of the present invention, assume that the digit "6" is being scanned by the transducer 27 to produce a pulse sequence as shown by curve A in FIG. 11. As has been explained previously, the first pulse will be positive, and this pulse will be amplified by the amplifier 31 to initiate a continuout pulse output by the gate generator circuit 33 for fifteen time intervals, as shown by curve B in FIG. 11.

The output of the gate generator circuit 33 will appear over conductor 35 and is applied to the differentiator circuit 36 which develops a single output pulse also at the first time interval, as seen by the curve C in FIG. 11, and this single pulse has three uses. First, it "resets" the flip-flop relay circuits 44 and 45 by means of conductors 34 and 42; it resets the counter 46 through conductors 34 and 43; and it is applied to the 1½ time interval delay circuit 37.

In addition to the above applications of the first positive pulse, the first pulse is delivered after a delay of one time interval as seen by curve D in FIG. 11 to the polarity detector circuits 48 and 50. Since the first pulse is positive, the detector 48 develops an output pulse which is applied over conductors 49 and 53 to the AND gate 41, but the gate 41 will not be activated since there is a delay by the circuit 37. However, this first output pulse on the conductor 49 is conveyed by conductors 54 and 85 to step the counter 46 to the first output stage.

Therefore, the curve E in FIG. 11 shows the pulses which appear over the conductor 49 as the output pulses of the polarity detector circuit 48, and the curve F in FIG. 11 shows the pulses which appear, after being inverted, over the conductor 52. Since each of these pulses is applied to the counter circuit 46, the curve G represents a combination of the curves E and F.

With the relays 44 and 45 "reset," the output of each relay is fed to one of the input terminals of the opposite relay's AND gate input. For example, the output of the relay 45 is connected by means of the conductor 80 to the AND gate 40, and the output of the relay 44 is connected by means of the conductor 81 to the AND gate 41.

Now it will be remembered that the first pulse has been applied to the delay circuit 37. Therefore, after a 1½ time interval delay, this first pulse appears as shown by curve H in FIG. 11 and is used to activate the single shot circuit 38 for developing a continuous pulse output as shown by curve I in FIG. 11. With the output provided by the single shot circuit 38, both of the AND gates 40 and 41 become conditioned for switching either the relay 44 or the relay 45 depending upon the polarity of the next (or second) pulse over either the conductor 53 or the conductor 56.

The second pulse will be negative in polarity for the symbol "6" and will have no effect on the differentiator circuit 36. However, a pulse will be developed in the conductor 52 as described previously and will be conveyed to the AND gate 41 by the conductor 56. Since the AND gate 41 is conditioned at the arrival of this second pulse, the flip-flop relay circuit 45 will switch to its "set" position and provide a continuous output pulse over the remaining time intervals to each of the AND gates 66, 67, 68 and 69.

The curve J in FIG. 11 shows the pulse outputs of the AND gate 41, and the curve K shows that there is no output for the gate 40 over the time intervals for the symbol "6." In addition, the curve L shows the continuous output pulse that the flip-flop relay 45 develops when it is "reset" by the first pulse and that this pulse is terminated when the relay 45 is "set." The curve M shows that the output of the relay 44 continues to be applied to the AND gate 41 during all time intervals for the symbol "6." Two further curves, curves N and P, indicate the output of the relay 45 when it is "set" and that the output of the relay 44 for a "set" position remains at zero.

With the "negative" AND gates 66–69 conditioned by an output from the flip-flop relay 45, it only remains for the counter 46 to produce an output indicative of the total number of pulses for the symbol "6." As seen in the chart in, for example, FIG. 10, the total number of pulses for the symbol "6" is six pulses. Therefore, the output from the counter 46 will be stepped to its second stage, to its third stage, at seq., until the sixth stage of the counter is reached where the counter 46 rests.

With the counter 46 stopped at its sixth output stage, its output will activate the AND gate 67. In response thereto, the AND gate 67 develops a pulse which is indicative of the symbol "6," which was the symbol scanned.

It will be noted in the circuit diagram shown in FIG. 9 that as the counter 46 is stepped to its various stages to reach the sixth stage, the AND gates 66 and 69 also will be pulsed since they receive the output from the relay 45 and, also, receive, even though momentarily, the output of the counter 46 while stepped to its fourth and fifth stages, respectively. However, this is only a momentary situation since the counter 46 is stepped further to its sixth stage and it is only at this final stage that it rests. In this manner, the AND gate 60 develops the signal which is indicative of the "1" symbol.

For a further example, assume that the second pulse is positive and that there are a total of three pulses in the signal developed by the transducer 27, which are the characteristics for the symbol "1" as seen in FIG. 10. The only output from the circuit in FIG. 9 which combines a positive pulse over conductor 83 and a pulse from the third stage of the counter 46 is through the AND gate 60 to indicate a symbol "1."

It may be seen now that the method of the present invention may be most nearly described as configuration micro-coding and differs from previous configuration micro-coding methods heretofore known in that the pulse sense (+ or −) as well as pulse sequence is used in the identification of the particular symbol being read. Therefore, the uniquely formed symbols, or type font, in accordance with the invention is compatible with the logic for the operation of the circuit shown in FIG. 9, although other circuits may be devised readily as desired.

A simple error check which would be 50% effective in detecting errors due to the gain or loss of a single pulse would be the determination of the algebraic sum of the pulses for a particular symbol. For example, an algebraic sum of "zero" should be obtained for even total pulse counts, and a "minus one" or "plus one" sum for odd total pulse counts.

A final error check may be accomplished by a time sequence comparison with the appropriate sequence stored in a memory circuit. The appropriate sequence that would be stored would be determined by the main logic identification, and the use of minimum logic identification would save considerable time in the recognition and error checking operation, since it would not be necessary to search through a memory circuit for the matching sequence.

Of course, it will be understood that the magnitude of each pulse in a signal representative of a particular symbol may be altered by changing the composition of the magnetizable material or ink of which the symbol is formed. For example, the use of an ink containing carbonyl iron produces a signal of greater magnitude than an ink containing oxides. The particular composition of the ink, however, relates only to the magnitude of these pulses, their polarity and their number remaining unchanged.

It will be necessary in providing a circuit responsive to the pulses for each symbol that the threshold level at which the reading circuit is responsive be sufficiently low so that the lowest amplitude of pulse will be detected. This is necessary because the amplitude of a pulse will depend upon the height of a parallelogram of magnetizable material as measured along the line transverse to the scan.

In other words, referring to FIG. 4, the parallelogram 19 produces a pulse of slightly less amplitude than the parallelogram 20, and the parallelogram 18 will produce a pulse of greater amplitude than either of the parallelograms 19 or 20. This is illustrated further in the curve shown in FIG. 5. Therefore, it will be necessary that the threshold level of the reading circuit be sufficiently low to detect and distinguish a pulse developed by the transducer passing over the parallelogram 19.

It should be noted that the uniquely formed symbols develop characteristic signal outputs in accordance with the method of the invention which are free from dependence upon pulse spacings, the magnitude of any particular pulse of a signal, or any particular wave shape for the signals. Therefore, in accordance with the invention, the information representative of a particular symbol is greatly simplified which, in turn, greatly simplifies the requirements for a reading circuit for automatically utilizing the information to produce outputs that will be representative of the information read.

Obviously, many modifications and variations of the present invention are possible in the light of the above teachings. Therefore, it is to be understood that the invention is not limited in its applications to the details of construction and arrangements of parts specifically described or illustrated, and that within the scope of the appended claims, it may be practiced otherwise than as specifically described or illustrated.

What is claimed is:

1. An apparatus for identifying symbols which is capable of producing a unique asynchronous logic code for each symbol when scanned by a single slit differentiating scan mechanism, comprising means to amplify an electrical pulse developed by said scan mechanism, means to apply an amplified pulse from said amplifying means to both a gate generator circuit means and a first delay circuit means, said gate generator circuit being adapted to provide a continuous output pulse over a predetermined number of time intervals in response to a first pulse developed by said scan mechanism, a differentiator circuit means connected to receive the continuous pulse output of said gate generator circuit means, at least two coincidence circuit means connected to receive an output pulse from said differentiator circuit means, a second delay circuit means connected to receive also the output of said differentiator circuit means, single shot timing circuit means connected to said second delay circuit means to provide a second pulse for transmission to said coincidence circuit means, pulse polarity detecting means responsive to a pulse from said first delay circuit means to provide a trigger pulse selectively to at least one of said two coincidence circuit means, one means connected to one of said coincidence circuit means to provide a continuous output pulse for connection to a plurality of additional coincidence circuit means, another means connected to another of said two coincidence circuit means to provide a continuous pulse output to a plurality of different coincidence circuit means, counter means connected to the output of said pulse polarity detecting means, and selected output stages of said counter means being connected to predetermined ones of said additional and separate coincidence circuit means whereby an indication is obtained which is indicative of a characteristic pulse sequence and responsive to the absolute number of pulses in said sequence and responsive to the polarity of the second pulse in said sequence for identifying a symbol.

2. A character recogniiton apparatus for identifying characters, formed substantially of parallelograms, the longer dimensions of which are parallel to each other, comprising: transducer means having a slit transverse to the direction of scan for scanning a character substantially perpendicular to the said longer parallelogram dimensions and producing for each character a three-level coded signal, the first level of which corresponds to a relatively positive pulse from said transducer, the second level of which corresponds to the absence of a pulse and a third level of which corresponds to a relatively negative pulse from said transducer; means responsive to the number of pulses in said signal at predetermined of said levels and to the sign of at least one predetermined sequential pulse in a signal to identify the character scanned; and means coupling the transducer output to said responsive means.

3. The character recognition apparatus claimed in claim 2 in which said characters are of magnetic material on a non-magnetic carrier and in which said transducer comprises a single slit magnetic readout head.

4. The character recognition apparatus claimed in claim 3 in which one of the slit walls in said single slit magnetic readout head has a staggered contour, said slit having a width which varies discontinuously along its length.

5. The character recognition apparatus claimed in claim 3 wherein said responsive means is responsive to the total number of positive and negative pulses in a signal and one predetermined pulse.

6. Apparatus for reading members of a type font each member of which has at least one substantially rectangular region of magnetizable material formed on a carrier of non-magnetizable material, comprising: means for scanning a font member with a transducer having a slit substantially transverse to the direction of scan, the direction of scan being substantially perpendicular to the two parallel sides of the rectangular region so that the area of magnetizable material changes abruptly during a scan to develop a plurality of ternary logic pulses, the senses of which depend upon the effect of the magnetizable material on the slit; and asynchronous logic means, coupled to said transducer, for totaling predetermined of the pulse senses and determining the state of at least one pulse to identify the character.

7. A characer recognition apparatus for identifying characters, the effective boundaries of which are substantially straight parallel lines comprising a single slit magnetic responsive differentiating scan means; means for moving one of said scan means and font relative the other to generate a three level code from said scan means; and means coupled to said scan means and responsive to the count of two of the three levels of said code and the sequence of one of said two levels for producing an indication of the font member scanned.

References Cited by the Examiner

UNITED STATES PATENTS

| | | | |
|---|---|---|---|
| 2,822,427 | 2/1958 | Atkinson et al. | 179—100.2 |
| 2,822,533 | 2/1958 | Duinker et al | 340—174.1 |
| 2,830,130 | 4/1958 | Greenwood | 340—174.1 |
| 2,898,576 | 8/1959 | Boozeman | 340—149.1 |
| 2,902,544 | 9/1959 | Barry | 179—100.2 |
| 2,905,927 | 9/1959 | Reed | 340—149.1 |
| 2,932,006 | 4/1960 | Glauberman | 340—149.1 |
| 3,114,131 | 12/1963 | Furr et al. | 340—146.3 |

MALCOLM A. MORRISON, *Primary Examiner.*

NEIL C. READ, *Examiner.*

S. M. URYNOWICZ, J. S. IANDIORIO, J. E. SMITH, *Assistant Examiners.*